United States Patent
Thorpe et al.

(10) Patent No.: US 12,124,895 B2
(45) Date of Patent: *Oct. 22, 2024

(54) TECHNIQUES FOR MANAGING ACCESS TO FILE SYSTEMS

(71) Applicant: Apple Inc., Cupertino, CA (US)

(72) Inventors: Jason R. Thorpe, San Francisco, CA (US); William R. Stouder-Studenmund, Bonita, CA (US)

(73) Assignee: Apple Inc., Cupertino, CA (US)

( * ) Notice: Subject to any disclaimer, the term of this patent is extended or adjusted under 35 U.S.C. 154(b) by 362 days.

This patent is subject to a terminal disclaimer.

(21) Appl. No.: 17/661,270

(22) Filed: Apr. 28, 2022

(65) Prior Publication Data

US 2022/0291975 A1      Sep. 15, 2022

Related U.S. Application Data

(63) Continuation of application No. 16/842,677, filed on Apr. 7, 2020, now Pat. No. 11,334,404.

(60) Provisional application No. 62/855,728, filed on May 31, 2019.

(51) Int. Cl.
| | |
|---|---|
| G06F 9/54 | (2006.01) |
| G06F 3/0482 | (2013.01) |
| G06F 9/451 | (2018.01) |
| G06F 16/16 | (2019.01) |
| H04L 67/02 | (2022.01) |
| H04L 67/06 | (2022.01) |

(52) U.S. Cl.
CPC ............ *G06F 9/545* (2013.01); *G06F 3/0482* (2013.01); *G06F 9/451* (2018.02); *G06F 16/168* (2019.01); *H04L 67/02* (2013.01); *H04L 67/06* (2013.01)

(58) Field of Classification Search
None
See application file for complete search history.

(56) References Cited

U.S. PATENT DOCUMENTS

| | | | |
|---|---|---|---|
| 10,452,456 B2* | 10/2019 | von Muhlen | H04L 69/321 |
| 11,216,343 B1* | 1/2022 | Emelyanov | G06F 9/45533 |
| 2002/0095589 A1 | 7/2002 | Keech | |
| 2012/0044153 A1 | 2/2012 | Arrasvuori et al. | |
| 2014/0108335 A1 | 4/2014 | Chan et al. | |
| 2018/0322136 A1* | 11/2018 | Carpentier | G06F 16/188 |

* cited by examiner

*Primary Examiner* — Craig C Dorais
(74) *Attorney, Agent, or Firm* — DICKINSON WRIGHT RLLP

(57) ABSTRACT

This application sets forth techniques for browsing and accessing files stored by a storage solution. The technique includes the steps of (1) prior to receiving a command to open a file, operating in a user space and engaging a first pathway by (a) instantiating, by an application, a preview application; (b) constructing a file path associated with the file stored in the volume; (c) providing the file path to the preview application; (d) generating, by the preview application, preview data of the file; and (e) receiving, by the preview application, a request to open the file; and (2) in response to receiving the request to open the file, engaging a second pathway to retrieve the file from the volume by: (a) generating, by the preview application, a system call to open the file; and (b) transmitting the system call to a kernel process executing within a kernel space.

20 Claims, 7 Drawing Sheets

TECHNIQUES FOR MANAGING ACCESS TO FILE SYSTEMS

CROSS-REFERENCE TO RELATED APPLICATIONS

The present application is a continuation of U.S. application Ser. No. 16/842,677, filed Apr. 7, 2020, entitled "TECHNIQUES FOR MANAGING ACCESS TO FILE SYSTEMS," now U.S. Pat. No. 11,334,404, issued May 17, 2022, which claims the benefit of U.S. Provisional Application No. 62/855,728, entitled "TECHNIQUES FOR MANAGING ACCESS TO FILE SYSTEMS," filed May 31, 2019, the content of which is incorporated herein by reference in its entirety for all purposes.

FIELD OF INVENTION

The described embodiments relate generally to accessing remotely-stored files or directories. More particularly, the embodiments relate to reducing the memory footprint generally associated with browsing and accessing files.

BACKGROUND

Computing devices typically include one or more non-volatile memories such as solid-state drives, hard disc drives, and the like. A file system can be implemented for one or more volumes stored on a non-volatile memory of a computing device. However, because the storage capacity of the non-volatile memory typically is limited, a user often utilizes external storage solutions and third-party cloud-based storage solutions to extend the storage resources that are available to the computing device.

In most cases, third-party providers provide applications that execute in user space on the computing device and coordinate the synchronization of remote files with local copies of the files stored on the file system of the computing device. In some cases, the overall ease of access to the data on an external storage solution can be hindered by a desire for security and privacy.

For example, on a computing device with robust security, the ability to plug in a hard drive through a universal serial bus type-c (USB-C) port may be hindered by the robust security. Specifically, due to security concerns, privileged kernel code of the computing device may be prevented from reading a data structure stored on the hard drive. In one example worst case scenario—where the privileged kernel code is allowed to read a data structure on the hard drive—the hard drive could contain malicious code that attempts to exploit buffer overflows in an attempt to cause the computing device to crash. Thus, users are faced with the difficult choice of sacrificing overall security in the interest of gaining operational flexibility.

SUMMARY

Representative embodiments set forth herein disclose techniques for maintaining robust security on a computing device while permitting the computing device to access data on an external storage solution. One benefit of implementing the techniques disclosed herein relates to a reduced memory footprint in conjunction with browsing a volume of the external storage solution.

According to some embodiments, a method is disclosed for browsing a volume with a reduced memory footprint. The method can be implemented at a computing device, and include the steps of (1) prior to receiving a command to open a file, operating in a user space and engaging a first pathway by (a) instantiating, by an application, a preview application, (b) constructing a file path associated with the file stored in the volume, (c) providing the file path to the preview application, (d) generating, by the preview application, preview data of the file, and (e) receiving, by the preview application, a request to open the file; and (2) in response to receiving the request to open the file, engaging a second pathway to retrieve the file from the volume by: (a) generating, by the preview application, a system call to open the file; and (b) transmitting the system call to a kernel process executing within a kernel space.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, where like reference numerals designate like structural elements.

DETAILED DESCRIPTION

Representative applications of methods and an apparatus according to the presently described embodiments are provided in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

The embodiments set forth techniques for enabling a computing device to maintain robust security while permitting the computing device to open files stored on a volume of a storage solution. The described techniques also help reduce a memory footprint associated with browsing and opening a file, including instances where the file is located on an external storage solution.

A more detailed description of these techniques is set forth below and described in conjunction with FIGS. 1, 2A-2E, and 3, which illustrate detailed diagrams of systems and methods that can be used to implement these techniques.

Figure 1:
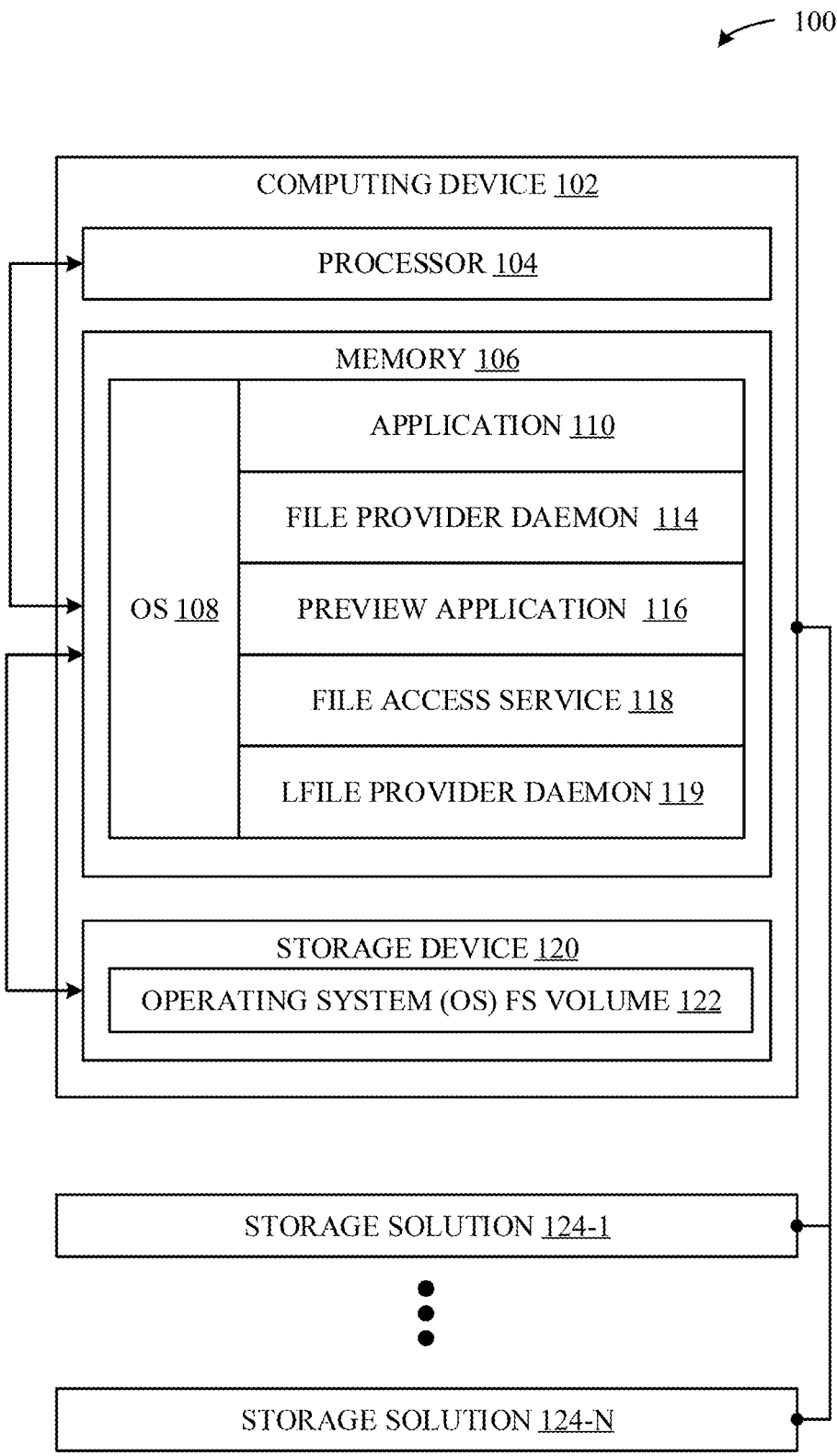
FIG. 1 illustrates a block diagram of different computing devices that can be configured to implement different aspects of the various techniques described herein, according to some embodiments.

FIG. 1 illustrates a block diagram 100 of a computing device 102 that can be configured to implement various aspects of the techniques described herein. Specifically, FIG. 1 illustrates a high-level overview of the computing device 102, which, as shown, can include at least one processor 104, at least one memory 106, and at least one storage device 120. According to some embodiments, the computing device 102 can represent any form of a computing device, e.g., a personal computing device, a smartphone, a tablet, a desktop computing device, a rack-mounted computing device, and so on. It is noted that the foregoing examples are not meant to be limiting. On the contrary, the computing device 102 can represent any form of a computing device without departing from the scope of this disclosure.

According to some embodiments, the processor 104 can be configured to operate in conjunction with the memory 106 and the storage device 120 to enable the computing device 102 to implement the various techniques set forth in this disclosure. According to some embodiments, the storage device 120 can represent a storage device that is accessible to the computing device 102, e.g., a hard drive, a solid-state drive (SSD), a mass storage device, a remote storage device, and the like. In some embodiments, the storage device 120 can be a storage device internal to the computing device 102. According to some embodiments, the storage device 120 can be configured to store an operating system (OS) file system volume 122 that can be mounted at the computing device 102, where the OS file system volume 122 includes an OS 108 that is compatible with the computing device 102. According to some embodiments, the OS 108, the OS file system volume 122, and the storage device 120 represent entities that are trusted within the computing device 102.

It is noted that trusted entities can include software that is native to the OS 108, software that originates from a trusted source, and the like. In particular, a trusted entity is one which the computing device 102 has reason to believe originates from a trusted source and thus presents minimal risks of causing harm to the computing device 102. As an example, trusted software can be confirmed through the use of signed certificates between the trusted software and the OS 108. In contrast, untrusted entities can be of unknown origin, or from sources other than the source that created the OS 108. Untrusted entities are of unknown provenance and quality, and, in some cases, can be riddled with bugs or malicious code. In this regard, untrusted software can be restricted from accessing the storage device 120 and the OS file system volume 122—and, vice versa, software executing within the kernel is restricted from accessing untrusted entities.

According to some embodiments, and as shown in FIG. 1, the OS 108 can enable a variety of processes to execute on the computing device 102, e.g., OS daemons, native OS applications, user applications, and the like. As described in greater detail herein, such applications can include an application 110, a file provider daemon 114, a preview application 116, one or more file access services 118, and a live file (Lfile) provider daemon 119.

For example, the application 110 illustrated in FIG. 1 can represent an application that is native to the OS 108 (e.g., a photo application, a mail application, a contacts application, and the like). As the application 110 is native to the OS 108, the application 110 constitutes trusted software and thus the application 110 can access files within the OS file system volume 122 without restriction.

According to some embodiments, the application 110 is a file application that provides a central place from which a user can access files stored on the computing device 102 or on an external storage solution (e.g., storage solutions 124, described further herein). According to some embodiments, the application 110 can be configured to find, organize, open, and delete one or more files in an accessible volume, and supports features like drag-and-drop. As described in greater detail herein, the application 110 can be configured to make calls that are transmitted to the preview application 116.

According to some embodiments, the preview application 116 can be configured to provide previews of files without opening the files. Such previews can include metadata and other information associated with the files. In some examples, the preview application 116 can function as a file browser that operates independently from a host application—such as the application 110—and includes the functionality to generate user interfaces. For example, a user interface generated by the preview application 116 can be presented through a display device (not illustrated in FIG. 1) that is communicably coupled to the computing device 102. It should be appreciated that the user interface generated by the preview application 116 can include several user interface (UI) objects such as buttons, menus, icons, and the like. For example, the user interface can include an individual UI object that, when selected, causes the preview application 116 to display one or more relevant files/folders to a user.

As a brief aside, it is noted that the term "file" used herein can represent any combination of data for documents, spreadsheets, presentations, messages, videos, audio files, images, files, and the like. It is also noted that the term "directory" used herein can represent a hierarchical construct that contains a collection of files and/or sub-directories in relation to the hierarchy. In one example, a file represented within a user interface represents a file with one or more files, directories, and sub-directories. The directory hierarchy can be associated with a root directory for a volume stored in the storage device 120, in the storage solution 124, or the like. It is further noted that the term "data object" can be used to represent a file or a directory as described above.

According to some embodiments, the file provider daemon 114 can perform synchronization/enumeration procedures, using enumeration logic, to monitor enumerated files included in one or more volumes associated with one or more file systems, both locally and remotely. Furthermore, as described in greater detail herein, the file provider daemon 114 can communicate with different file access services 118 that enable various user space file systems to interface with a native kernel space file system. Additionally, the file provider daemon 114 can enable volumes utilizing different file systems to be mounted by the OS 108.

In this fashion, the file provider daemon 114 can manage calls to access or modify various files or directories in the various volumes mounted by the OS 108 of the computing device 102. It is noted that the term "daemon" used herein can refer to any software, thread, or process. A non-limiting example of a daemon is a process or program that runs as a background process and that can wait for events or times to perform operations. In another non-limiting example, a daemon runs continuously and exists for the purpose of handling periodic service requests that a computer system expects to receive. The daemon program forwards the request to other programs (or processes) as appropriate.

According to some embodiments, each file access service 118 can provide access to a particular file system, e.g., a local file system, a network file system, a cloud-based file system, a volume file system, and the like. Each file access service 118 can perform enumeration and/or synchronization procedures, using enumeration logic, for a set of files within the domain of the file access service 118. Each file access service 118 can also communicate data related to an active set of files identified by the file provider daemon 114 and associated with the corresponding file system. As described in greater detail herein, each file access service 118 can also assist the file provider daemon 114 in providing the preview application 116 with updated versions of relevant files that are being displayed to a user.

According some embodiments, the Lfile provider daemon 119 includes the functionality to orchestrate read/write access to volumes associated with the file access services 118 in accordance with selections of files made within the preview application 116 or accessed via a root file system implemented by a kernel of the OS 108. For instance, the Lfile provider daemon 119—with the assistance of the file provider daemon 114—can perform validation procedures that ensure only an authorized application can access a file. Additionally, the Lfile provider daemon 119 can engage in cooperative communications with several different applications so that any application that seeks to access a selected file can receive an up-to-date version of the selected file—or, in some cases, prevent an open file currently being accessed by one application from being concurrently accessed by another application. In other words, the Lfile provider daemon 119 can manage the sharing of files among multiple applications on the computing device 102 and/or among multiple computing devices 102 that share access to a file over a network.

According to some embodiments, and as shown in FIG. 1, various storage solutions 124 can be communicably coupled to the computing device 102. For example, a respective storage solution 124 can be communicably coupled to the computing device 102 through any combination of wired and wireless connections including, e.g., Ethernet®, WiFi®, code division multiple access (CDMA), global system for mobile (GSM), universal serial bus (USB), and so on. It is noted that the foregoing example methods of communication are not meant to represent an exhaustive list. On the contrary, communicative coupling between the computing device 102 and a given storage solution 124 can take any form without departing from the scope of this disclosure.

In some embodiments, the storage solutions 124 can represent untrusted devices that include untrusted software. The untrusted devices can include any type of storage device used to store data—e.g., a hard drive, a flash memory device, a memory card such as a camera card, a solid-state drive, and the like. Furthermore, the untrusted device of a storage solution 124 can represent a storage service that provides storage space, e.g., a cloud-based storage service. Furthermore, a storage solution 124 can represent a storage device located within another computing device (e.g., a storage device in a laptop computer, a storage device in a smartphone, and the like). For example, the storage solution 124 can represent a tablet computer that stores digital photographs that the computing device 102 is seeking to access. It is noted that the foregoing example storage solutions 124 are not meant to represent an exhaustive list in any manner. On the contrary, the storage solutions 124 can represent any form of a storage device without departing from the scope of this disclosure. As an additional example, a given storage solution 124 can represent a rack-mounted storage device.

As described in further detail below, the file provider daemon 114 and the Lfile provider daemon 119 can be configured to enable the computing device 102 to securely access files stored in a given storage solution 124 and/or a volume in the storage device 120. By implementing the techniques described herein, the computing device 102 also operates in a manner that reduces the memory footprint that would otherwise be associated with accessing files using conventional techniques.

Accordingly, FIG. 1 sets forth a high-level overview of the different hardware/software architectures that can be implemented by the computing device 102 in order to carry out the various techniques described herein. Next, FIGS. 2A-2E—which are described in greater detail below—set forth example conceptual and method diagrams in which the application 110 can securely access a file in accordance with the techniques set forth herein.

Figure 2A:
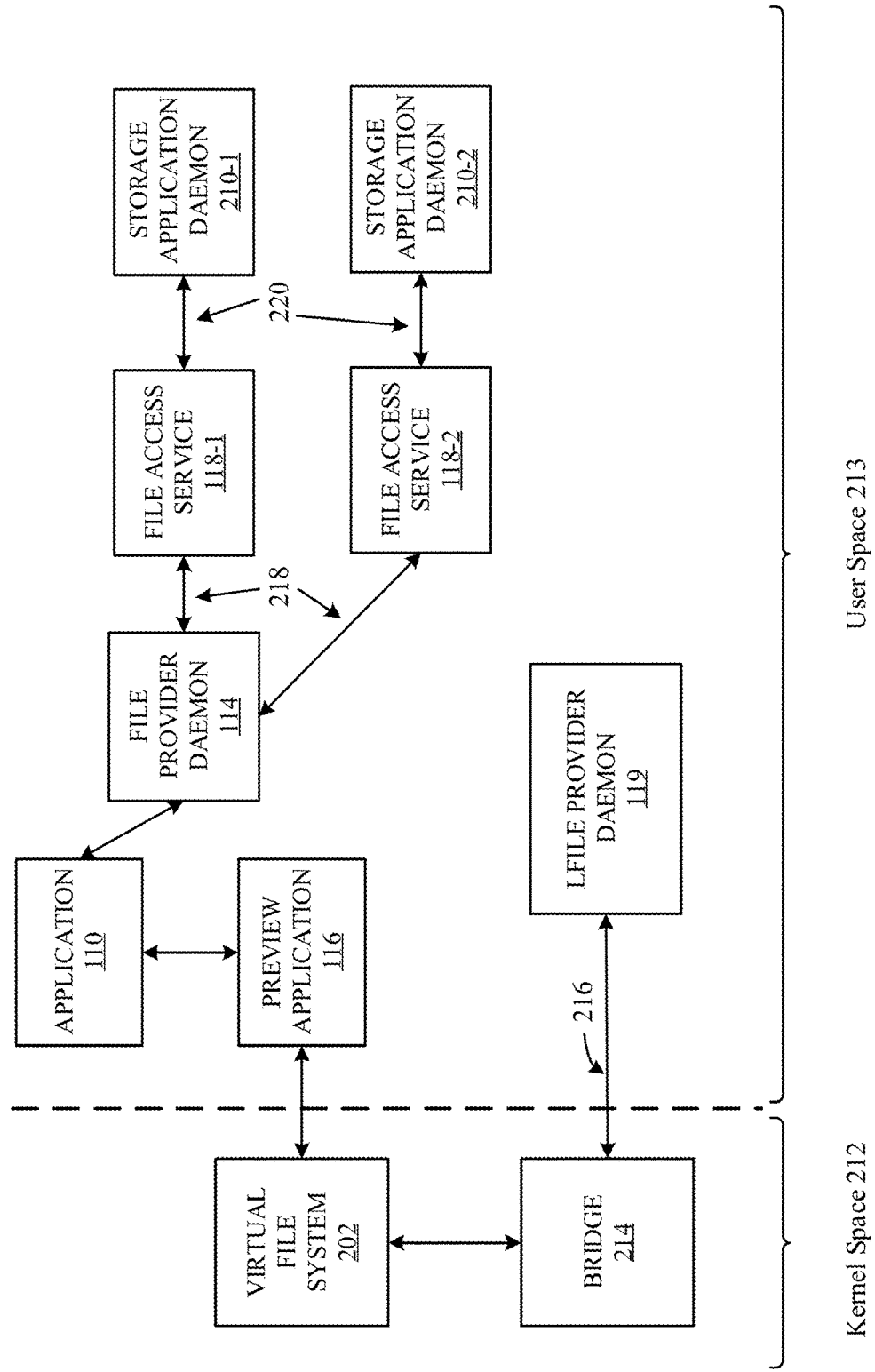
FIGS. 2A-2E illustrate conceptual and method diagrams in which a file is browsed and accessed, according to some embodiments.

FIGS. 2A-2E illustrate conceptual and method diagrams that demonstrate a technique in which the application 110 receives a request to access a file, according to some embodiments. In the block diagram 200 of FIG. 2A, an example architecture is illustrated that can be implemented within the computing device 102. As shown in FIG. 2A, an operating space of the computing device 102 can be divided into a kernel space 212 where kernel processes execute, and a user space 213 where user processes execute. In particular, a virtual file system 202 and a bridge 214 can execute within the kernel space 212. Conversely, the application 110, the file provider daemon 114, file access services 118-1 and 119-2, storage application daemons 210-1 and 210-2, and the Lfile provider daemon 119 can execute within the user space 213.

According to some embodiments, and as shown in FIG. 2A, a virtual file system 202 can execute within the kernel space 212. The virtual file system 202 can represent a general-purpose layer executing within the kernel space 212 that handles all file operation requests from various processes (e.g., the application 110). According to some embodiments, the virtual file system 202 is communicably coupled to a bridge 214 that, in turn, is communicably coupled to the Lfile provider daemon 119.

According to some embodiments, the bridge 214 can include extensions that effectively link the virtual file system 202 to the storage application daemons 210. In one example, the bridge 214 is implemented between kernel file system support code (e.g., code executing within the kernel space 212) and any file system stack (e.g., through the Lfile provider daemon 119) executing in the user space 213, and the bridge 214 enables the kernel to open files. According to some embodiments, a first messaging protocol 216 can provide a communication layer between the bridge 214 and the Lfile provider daemon 119.

According to some embodiments, the user space 213 can provide a form of sandboxing that enables the computing device 102 to restrict a program executing in the user space 213 from accessing storage and other resources owned by the operating system 108 or its kernels (executing in the kernel space 212). It should be noted that the various terms derived from the term "sandbox" used herein are not meant to be limiting. For example, a sandboxed mode can include (but is not limited to) any general security mechanism that can create a restrictive computing environment for one or more components executing within the computing device 102.

Within the architecture illustrated in the block diagram 200, the application 110 is communicably coupled to a storage solution 124-1 and a storage solution 124-2 by way of different software entities that are logically disposed between the application 110 and the storage solutions 124-1 and 124-2. In particular, and as illustrated in FIG. 2A, the application 110 is communicatively coupled to the file provider daemon 114. In turn, the file provider daemon 114 is communicatively coupled to a file access service 118-1 and a file access service 118-2. According to some embodiments, the file provider daemon 114 is communicably coupled to the file access services 118-1 and 118-2 by way of a file provider messaging protocol 218. In some examples, the file provider messaging protocol 218 can include an inter-process communication system, a messaging protocol implemented across an abstraction boundary for third party protocols, and the like.

In any case, and as further illustrated in FIG. 2A, the file access service 118-1 is communicatively coupled to a storage application daemon 210-1 that is associated with a storage solution 124-1. Similarly, the file access service 118-2 is communicatively coupled to a storage application daemon 210-2 that is associated with a storage solution 124-2. According to some embodiments, the file access services 118 are communicably coupled to the storage application daemons 210 by way of a second protocol 220.

As a brief aside, it is noted that the second protocol 220 can be separate and distinct from the messaging protocol 218 described above—and, in some cases, the second protocol 220 can include both a messaging protocol and an overall service protocol. In particular, the second protocol 220 can leverage a service protocol that implements privilege separation and stability. For example, by implementing the second protocol 220 within the architecture illustrated in the block diagram 200, each of the storage application daemons 210 can execute in a manner that does not affect other storage application daemons 210 (if any). That is, if storage application daemon 210-1 crashes, such an event does not impact the other applications executing within the user space 213 (e.g., the storage application daemon 210-2 and the file access services 118). Thus, implementing the second protocol 220 between the file access services 118 and the storage application daemons 210 can promote stability within the architecture illustrated in FIG. 2A.

Additionally, it is noted that applications increasingly rely on untrusted data that represents a growing attack vector for viruses and other malware. In one scenario, if an application becomes compromised through a buffer overflow or other security vulnerability, an attacker can gain control of the computing device 102. In this regard, by implementing the second protocol 220, the computing device 102 can reduce such a risk by providing sandboxing capabilities that limit the types of operations a particular application can perform. According to some embodiments, the sandboxed environment can further-increase security with privilege separation, which involves diving an application into smaller pieces that are responsible for a respective part of the application's overall functionality.

Additionally, and according to some embodiments, individual instances of the second protocol 220 can run in respective applications (e.g., respective storage application daemons 210), where each individual instance of the second protocol 220 is private to the respective application. In such an implementation, an individual instance of the second protocol 220 is associated with its own sandbox, which makes it possible to implement privilege separation where appropriate.

Returning now to FIG. 2A, it is noted that the file provider daemon 114 and the file access services 118 can interact with one another by way of an application programming interface (API) that is understood by (and accessible to) the file provider daemon 114 and the file access services 118. According to some embodiments, a given file access service 118—e.g., the file access service 118-1—can host a file provider (FP) type object that maintains where files are located within a file system that is managed by the storage solution 124-1 with which the file access service 118-1 is associated. According to some embodiments, the file access service 118-1 can include a trigger configured to track a location within a file system namespace (e.g., a location defined by a browsing hierarchy) in conjunction with an instantiation of the storage solution 124-1. In some embodiments, the trigger can be implemented as a folder in the file system namespace that remains empty until the storage solution 124-1 is instantiated. Upon instantiation of the storage solution 124-1, the folder can be updated with one or more locations within the file system namespace. In turn, the data within the trigger can be used to construct a file path to a file stored within the storage solution 124-1.

As previously noted herein, each storage application daemon 210 can represent a process that is associated with a respective storage solution 124 (discussed in FIG. 1). In particular, each storage application daemon 210 can be configured to access data that is managed by the respective storage solution 124. In the example illustrated in FIG. 2A, the storage application daemon 210-1 operates as a daemon that functions as an interface between a process executing on the computing device 102 and the respective storage solution 124-1. For example, when the application 110 requests to open a file managed by the storage solution 124-1, a request is transmitted to the storage application daemon 210-1. In turn, the storage application daemon 210-1 can respond by causing the file to be retrieved and delivered to the application 110.

According to some embodiments, each storage application daemon 210 can include various kinds of software depending on the type of storage solution 124 that is associated with the storage application daemon 210. In one example, when the storage solution 124-1 is coupled to the computing device 102 by way of a universal serial bus (USB), the storage application daemon 210-1 can include plugins for interfacing with different types of file systems (e.g., File Allocation Table (FAT), exFAT, Hierarchical File System (HFS) Plus, Apple File System (APFS), and the like). In another example, when the storage solution 124-2 is coupled to the computing device 102 by way of a network connection (e.g., a local network, the Internet, etc.), the storage application daemon 210-2 can implement network APIs that enable the storage application daemon 210-2 to interact with the storage solution 124 through network-based protocols (e.g., Server Message Block (SMB) protocol). It is noted that the foregoing scenarios are merely exemplary, and that the computing device 102 can be configured to implement any number of storage application daemons 210—configured to interface with any form of a file system—without departing from the scope of this disclosure.

It is noted that the techniques described herein can contribute to a reduced overall memory footprint within the computing device 102 that is associated with accessing files. This benefit is illustrated throughout FIGS. 2A-2C, which involves the computing device 102 accessing the storage solution 124-1 through respective and distinct pathways. In particular, a first pathway associated with the storage solution 124-1 does not involve or invoke any processes executing within the kernel space 212, whereas a second pathway associated with the storage solution 124-1 involves invoking a process executing with the kernel space 212. As described in greater detail below, each of these pathways can be used to perform different functions associated with accessing the data managed by the storage solution 124-1.

As previously described herein, one example scenario can involve the computing device 102 being coupled to (1) the storage solution 124-1 by way of a universal serial bus (USB) connection, and (2) the solution 124-2 by way of a network connection. In this scenario, a first step of FIG. 2A can involve the computing device 102 launching the application 110 to view files managed by the storage solution 124-1. To achieve this goal, the application 110 can launch the preview application 116, which can be configured to present a listing of files and directories that are managed by the storage solution 124-1. In turn, the preview application 116 can receive different commands via user input, e.g., a command to access a particular file managed by the storage solution 124-1. According to some embodiments, the command can include a file path (e.g., a Uniform Resource Locator (URL)) that can be constructed using data stored within the above-described trigger that is maintained by the file access service 118-1.

According to some embodiments, the pathway that is established across the preview application 116 and the storage application daemon 210-1 (by way of the application 110, the file provider daemon 114, and the file access service 118-1) constitutes the above-described first pathway. In this regard, the first pathway can be utilized to access the storage solution 124-1 without engaging any process executing within the kernel space 212, which contrasts conventional approaches that otherwise require engaging processes executing within the kernel space 212. By enabling browsing through utilization of the first pathway, the described architecture results in a reduced memory footprint for browsing type activities.

Figure 2B:
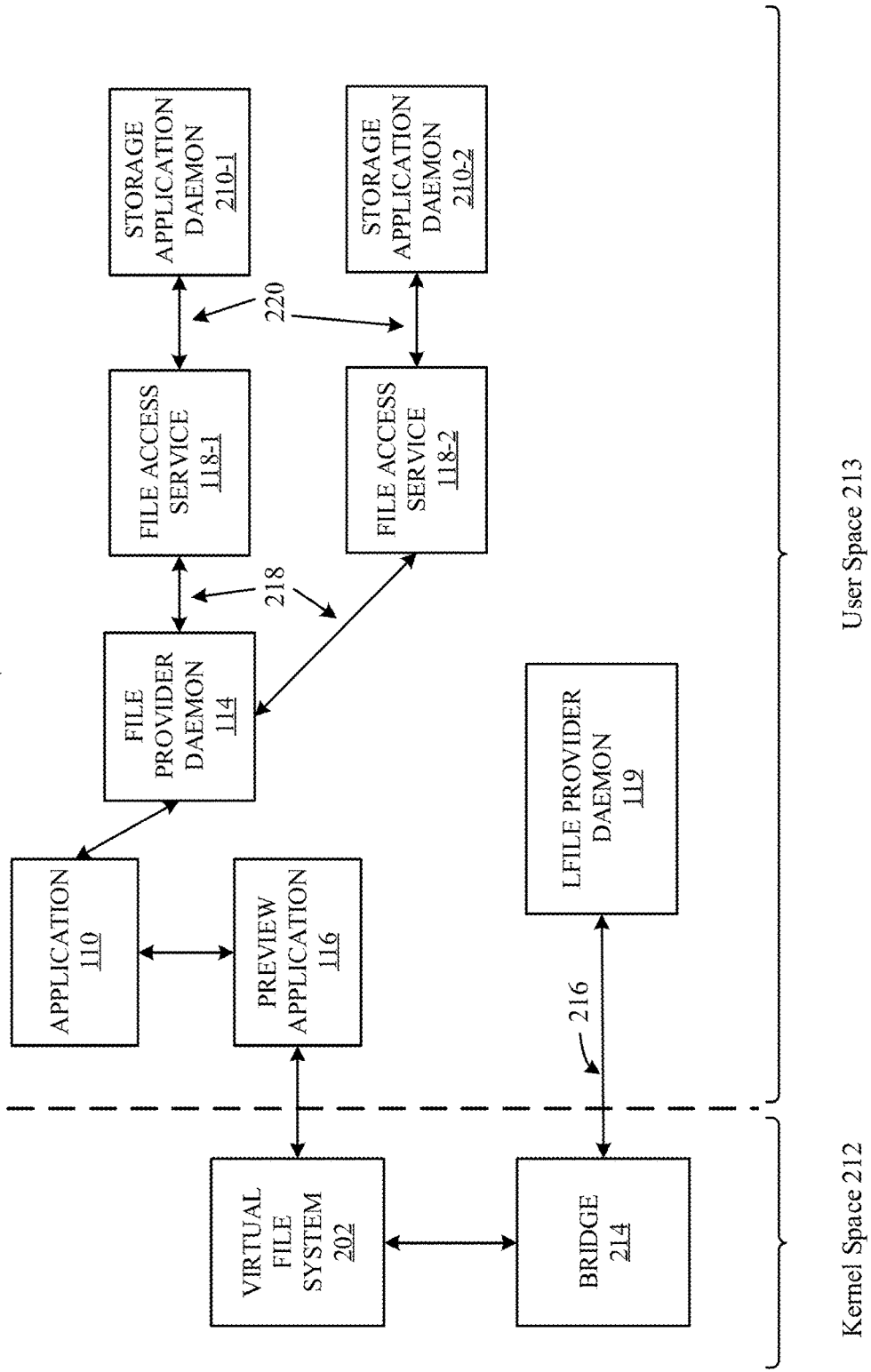

Turning now to FIG. 2B, a second step can involve a utilization of the aforementioned second pathway. In particular, the second step illustrated in FIG. 2B can involve the preview application 116 receiving a request to open a file. According to some embodiments, the preview application 116 can respond by generating a system call and providing a file path (associated with the file) to a process running within the kernel space 212, such as the virtual file system 202. Upon receiving the system call, the virtual file system 202 in turn makes a call to the bridge 214, which subsequently interacts with the Lfile provider daemon 119 in accordance with a third step that is illustrated in FIG. 2C.

Figure 2C:
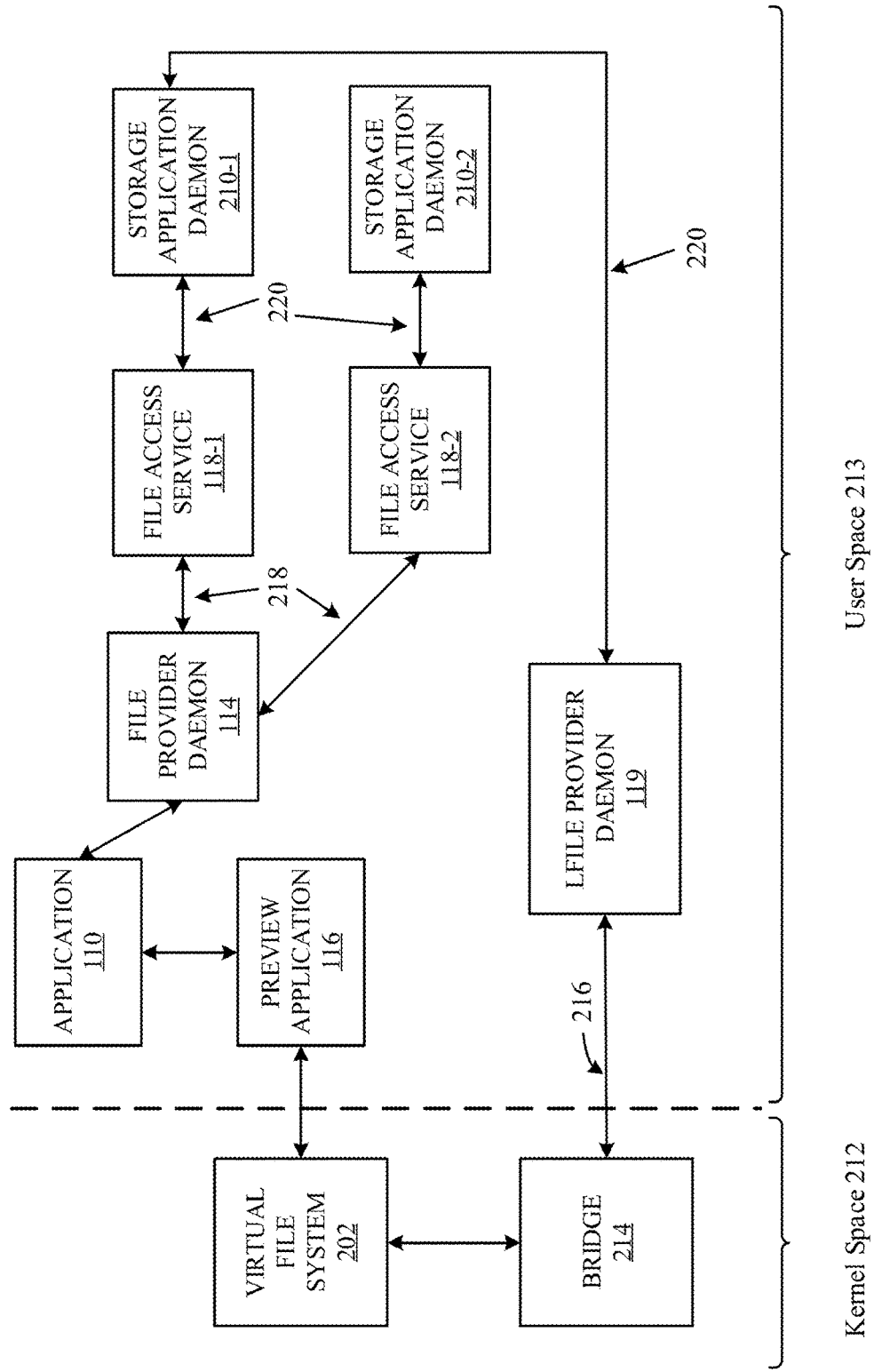

According to some embodiments, and as shown in FIG. 2C, the third step can involve the bridge 214 passing the file path and the request to open the file to the Lfile provider daemon 119 by way of the first protocol 216. In turn, the Lfile provider daemon 119 can pass the file path and the request to open the file to the storage application daemon 210-1 by way of the second protocol 220. In this regard, the second pathway communicably couples the virtual file system 202 to the storage application daemon 210-1 by way of the Lfile provider daemon 119.

As a brief aside, it is noted that the second protocol 220 can be utilized in both the first and second pathways described herein. In this regard, it can be beneficial to implement techniques to track a status of the file (e.g., location, deleted, modified, etc.). Accordingly, and in addition to the features of the second protocol 220 described above, the second protocol 220 can implement methods and techniques for referencing the same tracking object without using a reference counter. According to some embodiments, the second protocol 220 can implement a set of rules directed to tracking a state of the tracking object as defined between endpoints—e.g., the kernel space 212 and the storage application daemon 210-1. According to some embodiments, the second protocol 220 can maintain a state of the tracking object through the lifetime of the tracking object. After a file is no longer of interest—e.g., no longer referenced by the application 110—the second protocol 220 can implement garbage collection techniques to collect and delete the object.

Returning now to FIG. 2C, the storage application daemon 210-1 receives the file path and the request to open the file from the Lfile provider daemon 119 and translates the received request into a format that is understood by the storage solution 124-1. Continuing with the example described herein in conjunction with FIGS. 2A-2C, the storage solution 124-1 can represent a storage device that is connected via USB. In this example, translating the request can involve generating a USB-based request that is understood by the storage solution 124-1. According to some embodiments, the storage solution 124-1 can return an opaque file reference that is tracked by the storage application daemon 210-1. Ultimately, the transmission of the request to open the file to the storage application daemon 210-1 enables the file to be opened by the application 110.

Accordingly, FIGS. 2A-2E illustrate an example breakdown of the manner in which a file can be accessed using two different pathways. The first pathway excludes processes executing in the kernel space 212 while enabling data associated with a storage solution 124 to be browsed. The second pathway involves processes executing within the kernel space 212 and enables data associated with the storage solution 124 to be accessed (e.g., opened, written into, etc.). Additionally, it is noted that although the pathways have been described in relation to storage solutions 124, similar pathways can be implemented between the kernel space 212 and the storage device 120 without departing from the scope of this disclosure. Additionally, the steps described in FIGS. 2A-2C (i.e., steps 1-3) can be performed in any order without departing from the scope of this disclosure.

Figure 2D:
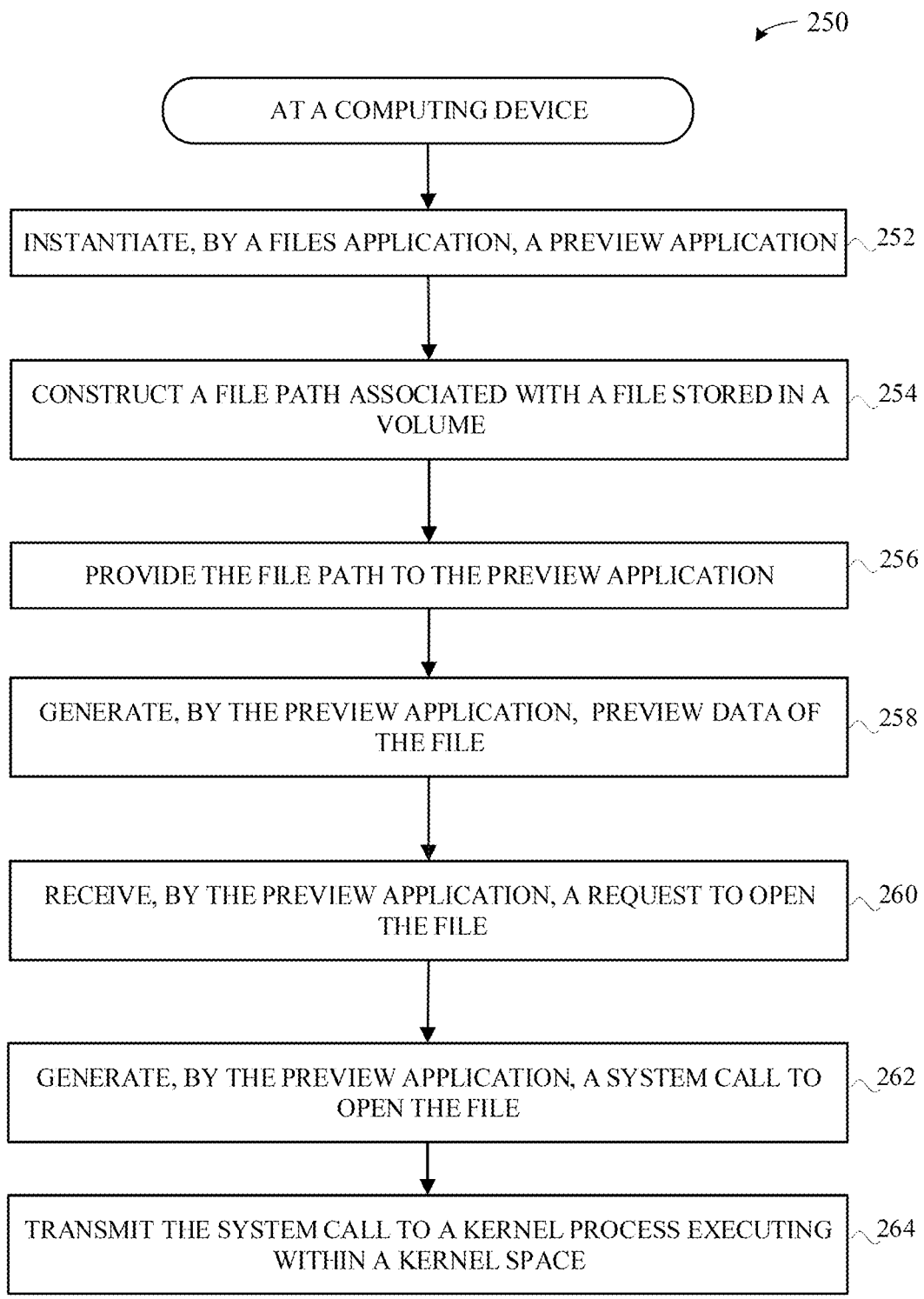

Additional high-level details will now be provided below in conjunction with FIG. 2D, which illustrates a method 250 that can be implemented to carry out the techniques described above in conjunction with FIGS. 2A-2C. As shown in FIG. 2D, the method 250 begins at step 252, where the application 110 executing on the computing device 102 instantiates a preview application (as described above in conjunction with FIG. 2A). At step 254, the application 110 constructs a file path associated with a file stored in a volume (as also described above in conjunction with FIG. 2A). At step 256, the application 110 provides the file path to the preview application 116. Steps 252-256 can involve, for example, a user inserting a memory card into the computing device 102—where, in turn, the application 110 constructs a file path associated with a file stored in a volume of the memory card, and the application 110 provides the file path to the preview application 116.

At step 258, the preview application 116 generates a preview data of the file (as described above in conjunction with FIG. 2A). This can involve, for example, the preview application 116 utilizing the first pathway (described above in conjunction with FIG. 2A) to continue generating preview data associated with the volume. Thus, the preview application 116 utilizes the first pathway while carrying out browsing-related tasks, which does not involve any processes executing within the kernel space 212.

At step 260, the preview application 116 receives a request to open the file (as described above in conjunction with FIG. 2B). At step 262, the preview application 116 generates a system call to open the file (as also described above in conjunction with FIG. 2B). At step 264, the preview application 116 transmits the system call to a process executing within the kernel space 212 (as also described above in conjunction with FIG. 2B). According to some embodiments, the preview application 116 passes the file path along with the system call to the process executing within the kernel space 212.

Figure 2E:
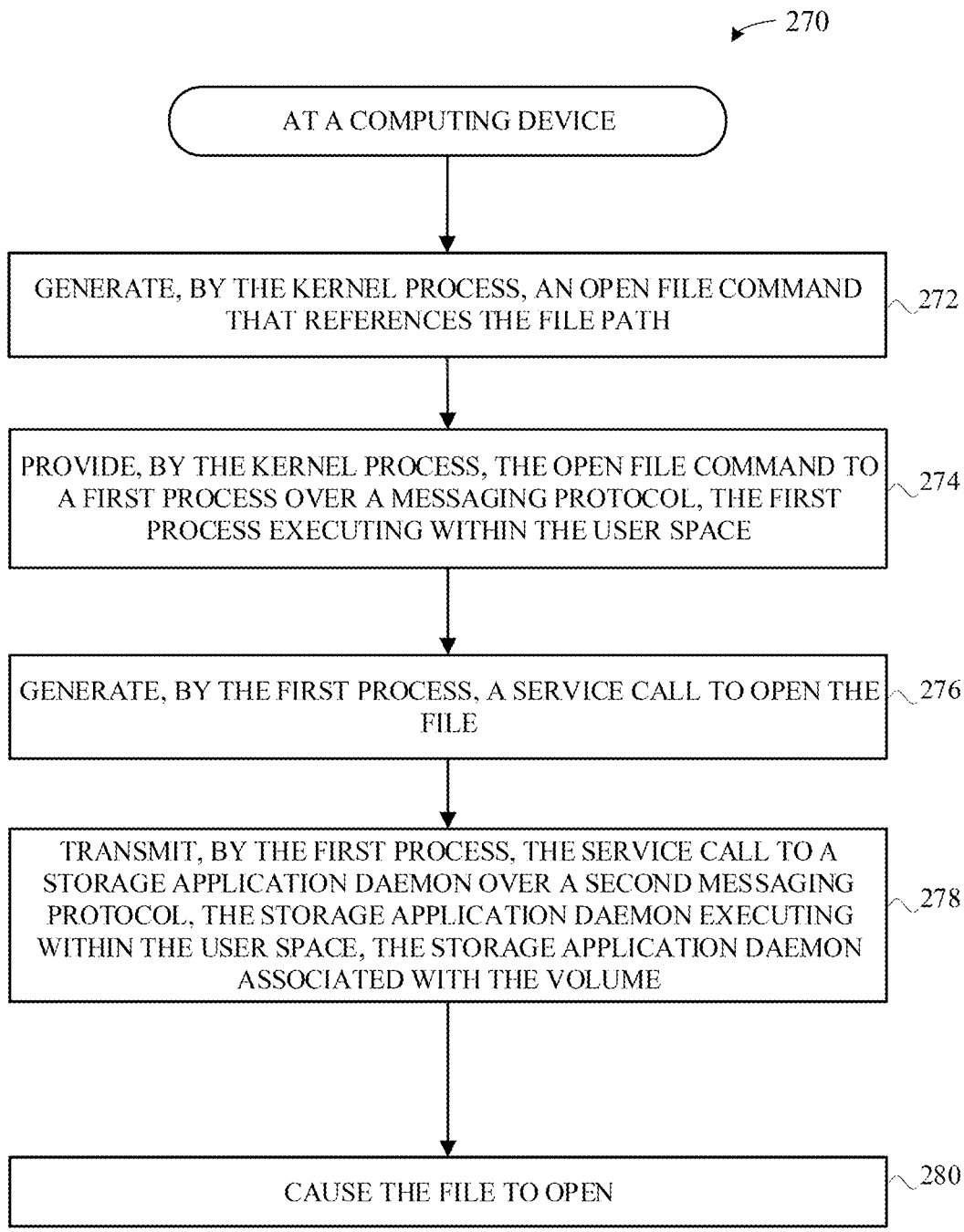

Additional high-level details will now be provided in conjunction with FIG. 2E, which illustrates a method 270 that can be implemented to carry out the techniques described above in conjunction with FIGS. 2A-2C. As shown in FIG. 2E, the method 270 begins at step 272, where the kernel process generates an open file command that references the file path. As described above in conjunction with FIGS. 2A-2C, this can involve, for example, the virtual file system 202 receiving the open file command and file path. In turn, the virtual file system provides these calls to the bridge 214. At step 274, the kernel process provides the open file command to a first process over a messaging protocol, where the first process executes within the user space (as described above in conjunction with FIG. 2C). This can involve, for example, the bridge 214 providing the open file command to the Lfile provider daemon 119 using the first protocol 216.

At step 276, the first process generates a service call to open the file. At step 278, the first process transmits the service call to a storage application daemon over a second messaging protocol, where the storage application daemon executes within the user space and the storage application daemon is associated with the volume (as described in conjunction with FIG. 2C). This can involve, for example, the Lfile provider daemon 119 transmitting a service call to a storage application daemon 210-1 using the second protocol 220. At step 280, the transmission of the service call causes the file to open (as described above in conjunction with FIG. 2C).

Accordingly, FIGS. 2A-2E illustrate a manner in which the application 110 and the preview application 116 can use a first pathway to browse data stored in a volume and use a second pathway to access data stored in the volume. By using the two pathways, a memory footprint of browsing a volume is reduced, as the first pathway does not engage any processes executing in the kernel space 212. Utilizing of the techniques set forth herein can also enable the computing device 102 to access data stored in a volume of an untrusted entity in a secure manner.

Figure 3:
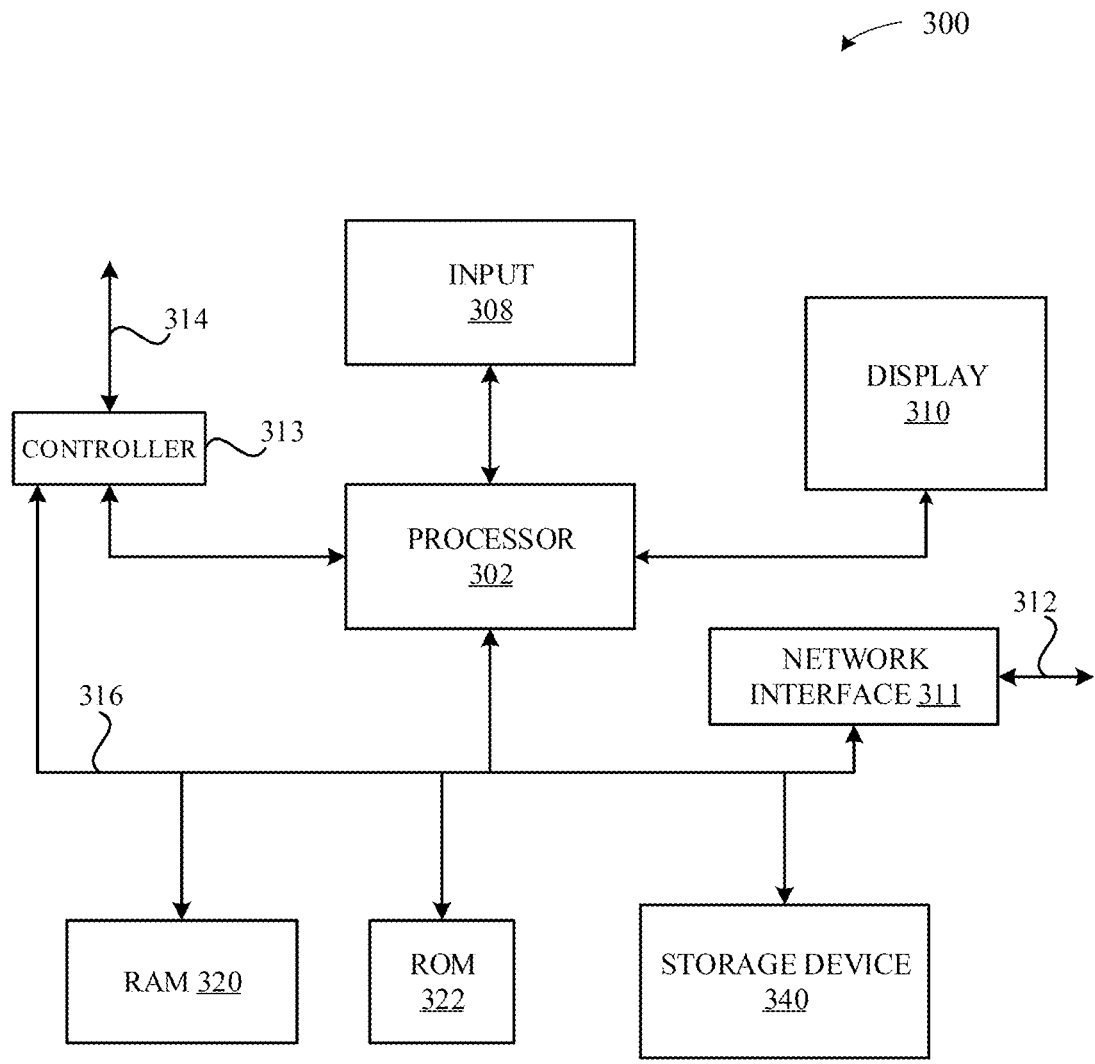
FIG. 3 illustrates a detailed view of a computing device that can represent the computing device of FIG. 1 used to implement the various techniques described herein, according to some embodiments.

FIG. 3 illustrates a detailed view of a computing device 300 that can be used to implement the various components described herein, according to some embodiments. In particular, the detailed view illustrates various components that can be included in the computing device 102 illustrated in FIG. 1. As shown in FIG. 3, the computing device 300 can include a processor 302 that represents a microprocessor or controller for controlling the overall operation of the computing device 300. The computing device 300 can also include a user input device 308 that allows a user of the computing device 300 to interact with the computing device 300. For example, the user input device 308 can take a variety of forms, such as a button, keypad, dial, touch screen, audio input interface, visual/image capture input interface, input in the form of sensor data, and so on. Still further, the computing device 300 can include a display 310 that can be controlled by the processor 302 to display information to the user. A data bus 316 can facilitate data transfer between at least a storage device 340, the processor 302, and a controller 313. The controller 313 can be used to interface with and control different equipment through an equipment control bus 314. The computing device 300 can also include a network/bus interface 311 that couples to a data link 312. In the case of a wireless connection, the network/bus interface 311 can include a wireless transceiver.

As noted above, the computing device 300 also includes the storage device 340, which can comprise a single disk or a collection of disks (e.g., hard drives), and includes a storage management module that manages one or more partitions within the storage device 340. In some embodiments, storage device 340 can include flash memory, semiconductor (solid-state) memory or the like. The computing device 300 can also include a Random-Access Memory (RAM) 320 and a Read-Only Memory (ROM) 322. The ROM 322 can store programs, utilities or processes to be executed in a non-volatile manner. The RAM 320 can provide volatile data storage, and stores instructions related to the operation of processes and applications executing on the computing device 102, including at least the application 110, the file provider daemon 114, the preview application 116, the file access service 118, and the Lfile provider daemon 119.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid-state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it should be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It should be apparent to one of ordinary skill in the art that many modifications and variations are possible in view of the above teachings.

What is claimed is:

1. A method for browsing volumes with reduced memory footprints, the method comprising:
    by a kernel process executing within a kernel space on a computing device:
        receiving, from an application executing on the computing device, a request to open a file stored in a volume accessible to the computing device, generating an open file command that references a file path of the file, and providing the open file command to a first process over a first messaging protocol, wherein the first process executes within a user space on the computing device; and by the first process executing within the user space on the computing device:
generating a service call to open the file, and
transmitting the service call to a storage application daemon over a second messaging protocol, wherein the storage application daemon:
executes within the user space,
is associated with the volume, and
causes the file to be opened.

2. The method of claim 1, further comprising, subsequent to the generating:
transmitting, to a virtual file system, the open file command and the file path.

3. The method of claim 2, wherein the virtual file system provides the open file command and the file path to a bridge entity that links the virtual file system to a plurality of storage application daemons.

4. The method of claim 3, wherein the bridge entity is implemented between the kernel space and any file system stack executing in the user space.

5. The method of claim 1, wherein the first process comprises a live file provider daemon that orchestrates read/write access to volumes associated with different file access services.

6. The method of claim 5, wherein:
the application is communicably coupled to the storage application daemon by way of one of the file access services, and
the file access service communicates with the storage application daemon using the second messaging protocol.

7. The method of claim 5, wherein:
the application is communicably coupled to the storage application daemon by way of a file provider daemon, wherein:
the file provider daemon is communicably coupled to a file access service by way of a file provider messaging protocol, and
the file access service is coupled to the storage application daemon by way of the second messaging protocol.

8. A non-transitory computer readable storage medium configured to store instructions that, when executed by a processor included in a computing device, cause the computing device to browse volumes with reduced memory footprints, by carrying out steps that include:
by a kernel process executing within a kernel space on the computing device:
receiving, from an application executing on the computing device, a request to open a file stored in a volume accessible to the computing device,
generating an open file command that references a file path of the file, and
providing the open file command to a first process over a first messaging protocol, wherein the first process executes within a user space on the computing device; and
by the first process executing within the user space on the computing device:
generating a service call to open the file, and
transmitting the service call to a storage application daemon over a second messaging protocol, wherein the storage application daemon:
executes within the user space,
is associated with the volume, and
causes the file to be opened.

9. The non-transitory computer readable storage medium of claim 8, wherein the steps further include, subsequent to the generating:
transmitting, to a virtual file system, the open file command and the file path.

10. The non-transitory computer readable storage medium of claim 9, wherein the virtual file system provides the open file command and the file path to a bridge entity that links the virtual file system to a plurality of storage application daemons.

11. The non-transitory computer readable storage medium of claim 10, wherein the bridge entity is implemented between the kernel space and any file system stack executing in the user space.

12. The non-transitory computer readable storage medium of claim 8, wherein the first process comprises a live file provider daemon that orchestrates read/write access to volumes associated with different file access services.

13. The non-transitory computer readable storage medium of claim 12, wherein:
the application is communicably coupled to the storage application daemon by way of one of the file access services, and
the file access service communicates with the storage application daemon using the second messaging protocol.

14. The non-transitory computer readable storage medium of claim 12, wherein:
the application is communicably coupled to the storage application daemon by way of a file provider daemon, wherein:
the file provider daemon is communicably coupled to a file access service by way of a file provider messaging protocol, and
the file access service is coupled to the storage application daemon by way of the second messaging protocol.

15. A computing device configured to browse volumes with reduced memory footprints, the computing device comprising a processor configured to cause the computing device to carry out steps that include:
by a kernel process executing within a kernel space on the computing device:
receiving, from an application executing on the computing device, a request to open a file stored in a volume accessible to the computing device,
generating an open file command that references a file path of the file, and
providing the open file command to a first process over a first messaging protocol, wherein the first process executes within a user space on the computing device; and
by the first process executing within the user space on the computing device:
generating a service call to open the file, and
transmitting the service call to a storage application daemon over a second messaging protocol, wherein the storage application daemon:
executes within the user space,
is associated with the volume, and
causes the file to be opened.

16. The computing device of claim 15, wherein the steps further include, subsequent to the generating:
- transmitting, to a virtual file system, the open file command and the file path.

17. The computing device of claim 16, wherein the virtual file system provides the open file command and the file path to a bridge entity that links the virtual file system to a plurality of storage application daemons.

18. The computing device of claim 17, wherein the bridge entity is implemented between the kernel space and any file system stack executing in the user space.

19. The computing device of claim 15, wherein the first process comprises a live file provider daemon that orchestrates read/write access to volumes associated with different file access services.

20. The computing device of claim 19, wherein:
- the application is communicably coupled to the storage application daemon by way of one of the file access services, and
- the file access service communicates with the storage application daemon using the second messaging protocol.

* * * * *